(12) United States Patent
Jachim et al.

(10) Patent No.: US 7,687,710 B2
(45) Date of Patent: Mar. 30, 2010

(54) OVERHEAD ELECTRICAL POWER TRANSMISSION LINE

(75) Inventors: Anton F. Jachim, St. Paul, MN (US); Douglas E. Johnson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 382 days.

(21) Appl. No.: 11/617,494

(22) Filed: Dec. 28, 2006

(65) Prior Publication Data

US 2008/0156524 A1 Jul. 3, 2008

(51) Int. Cl.
*H02G 7/00* (2006.01)
(52) U.S. Cl. .................. 174/40 R; 174/41; 174/43; 174/45 R; 248/58; 361/107
(58) Field of Classification Search .............. 174/3, 174/40 R, 41, 45 R, 45 TD, 43, 99 R, 137 R; 248/58, 61, 63, 64; 191/32; 343/890; 52/101, 52/291, 146; 361/107
See application file for complete search history.

(56) References Cited

U.S. PATENT DOCUMENTS

| 2,790,843 | A | | 4/1957 | Gordon |
| 2,831,048 | A | | 4/1958 | Weaver |
| 3,145,259 | A | * | 8/1964 | Leonard et al. ............ 174/43 |
| 3,234,319 | A | | 2/1966 | Gill |
| 3,676,578 | A | | 7/1972 | Cahill |
| 3,709,706 | A | | 1/1973 | Sowman |
| 3,795,524 | A | | 3/1974 | Sowman |
| 4,047,965 | A | | 9/1977 | Karst et al. |
| 4,346,255 | A | | 8/1982 | Nigol |
| 4,362,352 | A | | 12/1982 | Hawkins et al. |
| 4,679,672 | A | * | 7/1987 | Seddon et al. ............ 191/41 |
| 4,686,325 | A | * | 8/1987 | Marsico et al. ............ 174/40 R |
| 4,954,462 | A | | 9/1990 | Wood et al. |
| 5,171,942 | A | | 12/1992 | Powers |
| 5,185,299 | A | | 2/1993 | Wood et al. |
| 5,501,906 | A | | 3/1996 | Deve |
| 5,554,826 | A | | 9/1996 | Gentry |
| 5,689,417 | A | | 11/1997 | Shockley et al. |
| 5,789,701 | A | | 8/1998 | Wettengel et al. |
| 6,127,625 | A | * | 10/2000 | Castano ............ 174/40 R |
| 6,180,232 | B1 | | 1/2001 | McCullough et al. |
| 6,191,354 | B1 | | 2/2001 | Castano et al. |
| 6,245,425 | B1 | | 6/2001 | McCullough et al. |
| 6,304,838 | B1 | | 10/2001 | Brown |
| 6,329,056 | B1 | | 12/2001 | Deve et al. |
| 6,336,495 | B1 | | 1/2002 | McCullough et al. |
| 6,344,270 | B1 | | 2/2002 | McCullough et al. |
| 6,447,927 | B1 | | 9/2002 | McCullough et al. |
| 6,460,597 | B1 | | 10/2002 | McCullough et al. |
| 6,485,796 | B1 | | 11/2002 | Carpenter et al. |

(Continued)

FOREIGN PATENT DOCUMENTS

JP 2002-199569 7/2002

(Continued)

OTHER PUBLICATIONS

"HTLS Conductors: Reliability and Cost," A Proposal in Response to Funding Opportunity No. DE-PS02-05CH11270 to The U.S. Department of Energy, 3M Company, Jul. 2005, pp. 1-22.

(Continued)

*Primary Examiner*—Dhiru R Patel
(74) *Attorney, Agent, or Firm*—Gregory D. Allen; James A. Baker

(57) ABSTRACT

Dead-end-to-dead-end overhead electrical power transmission line with at least two different conductors, and method of selecting and installing the conductors.

19 Claims, 4 Drawing Sheets

U.S. PATENT DOCUMENTS

| | | | |
|---|---|---|---|
| 6,523,424 | B1 | 2/2003 | Hayes et al. |
| 6,544,645 | B1 | 4/2003 | McCullough et al. |
| 6,559,385 | B1 | 5/2003 | Johnson et al. |
| 6,692,842 | B2 | 2/2004 | McCullough et al. |
| 6,723,451 | B1 | 4/2004 | McCullough et al. |
| 6,796,365 | B1 | 9/2004 | McCullough et al. |
| 6,913,838 | B2 | 7/2005 | McCullough et al. |
| 7,057,103 | B1 * | 6/2006 | Peabody .................... 174/45 R |
| 7,093,416 | B2 | 8/2006 | Johnson et al. |
| 7,131,308 | B2 | 11/2006 | McCullough et al. |
| 7,494,271 | B2 | 2/2009 | Scholtz et al. |
| 7,516,051 | B2 | 4/2009 | Johnson et al. |
| 2004/0267513 | A1 | 12/2004 | Westermann et al. |
| 2005/0181228 | A1 | 8/2005 | McCullough et al. |
| 2006/0102377 | A1 | 5/2006 | Johnson et al. |
| 2006/0102378 | A1 | 5/2006 | Johnson et al. |
| 2006/0239238 | A1 | 10/2006 | Fernandez-Corbaton et al. |
| 2007/0009224 | A1 | 1/2007 | Browning |
| 2007/0038396 | A1 | 2/2007 | Zima et al. |
| 2007/0093995 | A1 | 4/2007 | Mollenkopf et al. |
| 2007/0271081 | A1 | 11/2007 | Johnson et al. |

FOREIGN PATENT DOCUMENTS

| | | |
|---|---|---|
| JP | 2006-333651 | 12/2006 |

OTHER PUBLICATIONS

U.S. Patent Application entitled "Ultrasonic Energy System and Method Including a Ceramic Horn," filed Mar. 31, 2003, having U.S. Appl. No. 10/403,643.

U.S. Patent Application entitled "Ceramic Oxide Fibers," filed Dec. 28, 2006, having U.S. Appl. No. 11/616,963.

U.S. Patent Application entitled "Installation of Spliced Electrical Transmission Cables," filed Mar. 7, 2006, having U.S. Appl. No. 11/276,607.

U.S. Patent Application entitled "Method for Selecting Conductors of an Overhead Power Transmission Line," filed Dec. 28, 2006, having U.S. Appl. No. 11/617,480.

U.S. Patent Application entitled "Overhead Electrical Power Transmission Line," filed Dec. 28, 2006, having U.S. Appl. No. 11/617,461.

U.S. Patent Application entitled "Overhead Power Transmission Line Conductor Selection," filed May 19, 2006, having U.S. Appl. No. 11/419,365.

Transmission and Distribution Committee, of the IEEE Power Engineering Society, "IEEE Standard for Calculating the Current-Temperature Relationship of Bare Overhead Conductors", Institute of Electrical and Electronics Engineers standard # 738, 1993, Calculation Module 23, IEEE Corporate Office.

Thrash et al, "Overhead Conductor Manual", Southwire Company Overhead Conductor Manual, First Edition 1994.

"A Method of Stress-Strain Testing of Aluminum Conductors and ACSR and A Method for Determining the Long Time Creep of Aluminum Conductors in Overhead Line", Aluminum Association Guide, Rev. 1999.

Kelly, D. K, and Jancauskas, J. R.; "Cable Sizing—Avoid Shortcuts and Do it Right", IEEE, 1996, pp. 2341-2346.

Kirshnasamy, S. G., Ford, G. L., and Orde, C. I.; "Predicting the Structural Performance of Transmission Lines Uprated by Reconductoring", IEEE Transactions on Power Apparatus and Systems, vol. PAS-100, No. 5, May 1981, pp. 2271-2277.

Chen, S.L., Black, W. Z., Loard, H. W. Jr.; "High Temperature Ampacity Model for Overhead Conductors", IEEE Transactions on Power Delivery, vol. 17, No. 4, Oct. 2002, pp. 1136-1141.

Chen, S.L., Black, W. Z., Loard, H. W. Jr.; "Closure on High Temperature Ampacity Model for Overhead Conductors", IEEE Transaction on Power Delivery, vol. 18, No. 2, Apr. 2003, pp. 647.

Chen, S.L., Black, W. Z., Fancher, M. L.; "High Temperature Sag Model for Overhead Conductors", IEEE Transaction on Power Delivery, vol. 18, No. 1, Jan. 2003, pp. 183-188.

Chen, S.L., Black, W. Z,, Fancher, M. L.; "Closure on 'High Temperature Sag Model for Overhead Conductors'", IEEE Transaction on Power Delivery, vol. 18, No. 4, Oct. 2003. pp. 1600-1601.

Filipovic-Gledja, V., Morgan, V. T., and Findlay, R. D.; "A Unified Model for Predicting the Electrical, Mechanical and Thermal Characteristics of Stranded Overhead-Line Conductors", Department of Electrical and Computer Engineering, McMaster University, Hamilton, Ontario, Canada, pp. 182-185.

Morgan, V. T.; Discussion of "High Temperature Ampacity Model for Overhead Conductors", IEEE Transactions on Power Delivery, vol. 18, No. 2, Apr. 2003, pp. 646-647.

Morgan, V. T., Discussion of "High Temperature Sag Model for Overhead Conductors", IEEE Transaction on Power Delivery, vol. 18, No. 4, Oct. 2003. pp. 1600.

Peyrot, A. H.; "Microcomputer-Based Nonlinear Structural Analysis of Transmission Line Systems", IEEE Transactions on Power Apparatus and Systems, vol. PAS-104, No. 11, Nov. 1985, pp. 3236-3244.

Ringler, P.; "Automated Methods of Power-Line Design/Analysis", Transmission & Distribution, Oct. 1990, pp. 70-73.

Rodolakis, A. J.; "Point-and-Click Cable Ampacity Studies", IEEE, Apr. 1998, pp. 53-56.

PLS-CADD™ (Power Line Systems—Computer Aided Design and Drafting), PowerLine® Systems Inc., <http://www.powline.com/products/pls_cadd.html>, pp. 1-9 [retrieved from the internet on Mar. 15, 2006].

Pondera Engineers, LLC, "Products, Nip & Tuck, Transmission Line Design and Engineering", <http://www.ponderaengineers.com/products/niptuck.asp>, [retrieved from the internet on Sep. 13, 2006].

Pondera Engineers, LLC, "Products, TLCADD, Transmission Line Design and Engineering", <http://www.ponderaengineers.com/products/tlcadd.asp>, [retrieved from the internet on Sep. 13, 2006].

Pondera Engineers, LLC, "Products, LD-DigiCAD—Transmission Line Design and Engineering", <http://www.ponderaengineers.com/products/ld-digicad.asp>, [retrieved from the internet on Sep. 13, 2006].

Pondera Engineers, LLC, "Products, PoleSTAR—3D Structure Analysis and Design", <http://www.ponderaengineers.com/products/polestar.asp>, [retrieved from the internet on Sep. 13, 2006].

RateKit Thermal Rating ToolKit, "Products, Ratekit Thermal Rating Toolkit, Ratekit Brochure", <http://www.cat-1.com/ratekit.html>, [retrieved from the internet on Sep. 5, 2006].

Pondera Engineers, "Products, TL-Pro Design Studio—Transmission Line Design and Engineering", <http://www.ponderaengineers.com/products/tl-pro_studio.asp>, [retrieved from internet on Sep. 5, 2006].

* cited by examiner

OVERHEAD ELECTRICAL POWER TRANSMISSION LINE

BACKGROUND

A variety of overhead (electrical) power transmission conductors is known in the art, including those having wires (e.g., aluminum wires, copper wires, aluminum alloy wires, and copper alloy wires) stranded around a core comprising, for example, steel wires or aluminum matrix composite wires (e.g., alpha alumina fibers in an aluminum or aluminum alloy (e.g., up to 2 percent by weight copper)).

Typically, the same overhead electrical power transmission conductor construction is used in a single tension section between dead-end towers, although combinations of constructions may be encountered when a tension section is repaired.

Due to the relatively high or higher cost of many overhead electrical power transmission conductors that are alternatives to the traditional steel-cored overhead electrical power transmission conductors, it is desirable to be able to use the higher cost overhead electrical power transmission conductors in selected areas of a tension section between dead-end towers. In another aspect, it is desirable to be able to have the construction flexibility to use at least two different overhead electrical power transmission conductors in a tension section between dead-end towers.

In another aspect, many overhead power transmission lines have specially designed tension sections such as long span crossings, segments that are specially designed to span obstacles such as rivers. As electrical load increases on these transmission lines, these long span crossings can become "thermal bottlenecks". That is, the long span crossings may constrain the current allowed to flow through the transmission line because as current flow increases, the long span crossing conductors heat up, elongate from thermal expansion, and sag to the maximum allowed, giving a minimum clearance below the crossing spans. It is often desirable to increase the current carrying capacity of these long span crossings. It may also be desirable to decrease the sag of a crossing span (also referred to as "limiting span") to allow more clearance, while maintaining the existing current carrying capacity. Also, it may be desirable to reduce the structural loads imposed on either the structures or conductor by severe weather.

SUMMARY

In one aspect, the present invention provides a method for providing an installed dead-end-to-dead-end overhead electrical power transmission line, the installed dead-end-to-dead-end overhead electrical power transmission line comprising:

first and second dead-end towers;
at least one suspension tower (also referred to as a "tangent tower") between the first and second dead-end towers; and
an overhead electrical power transmission conductor tension section having a length of at least 100 meters, and having a first end attached to the first dead-end tower and a second end attached to the second dead-end tower, the method comprising:
providing first and second dead-end towers;
providing at least one (in some embodiments, at least 2, 3, 4, 5, 6, 7, 8, 9, 10, 15, 20, 25, 50, 75, or even at least 100) suspension tower(s) between the first and second dead-end towers; and selecting an overhead electrical power transmission conductor tension section having first and second ends and a length of at least 100 meters (in some embodiments, at least 200, 300, 400, 500, 600, 700, 800, 900, 1000, 1200, 1500, 1800, 2100, 2400, 2700, 3,000, 5,000, 10,000, 15,000, 20,000, 25,000, or even at least about 30,000 meters), the overhead electrical power transmission conductor tension section comprising at least a first and a second sequential overhead electrical power transmission conductor tension subsection, wherein the first overhead electrical power transmission conductor tension subsection has a first coefficient of thermal expansion (e.g., in a range from zero to $25 \times 10^{-6}/° C.$; in some embodiments in a range from $8 \times 10^{-6}/° C.$ to $20 \times 10^{-6}/° C.$, or even $14 \times 10^{-6}/° C.$ to $20 \times 10^{-6}/° C.$), a first density (e.g., in a range from 1.4 $g/cm^3$ to 20 $g/cm^3$, in some embodiments, in a range from 2.7 $g/cm^3$ to 3.6 $g/cm^3$, or even in a range from 2.2 $g/cm^3$ to 4.5 $g/cm^3$), a first stress-strain behavior, and a first cross-sectional area, wherein the second overhead electrical power transmission conductor tension subsection has a second coefficient of thermal expansion (e.g., in a range from zero to $25 \times 10^{-6}/° C.$; in some embodiments in a range from $8 \times 10^{-6}/° C.$ to $20 \times 10^{-6}/° C.$, or even $14 \times 10^{-6}/° C.$ to $20 \times 10^{-6}/° C.$), a second density (e.g., in a range from 1.4 $g/cm^3$ to 20 $g/cm^3$, in some embodiments, in a range from 2.7 $g/cm^3$ to 3.6 $g/cm^3$, or even in a range from 2.2 $g/cm^3$ to 4.5 $g/cm^3$), a second stress-strain behavior, and a second cross-sectional area, wherein intentionally (i.e., purposely selecting based on at least one of the following properties to provide the specified, desired result) at least one of (a) the first and second coefficients of thermal expansion, (b) the first and second densities, (c) the first and second stress-strain behaviors, or (d) cross-sectional areas, at temperatures in the range from 20° C. to 75° C. (in some embodiments, in a range from 25° C. to 75° C., 20° C. to 100° C., 25° C. to 100° C., 20° C. to 125° C., 25° C. to 125° C., 20° C. to 150° C., 25° C. to 150° C., 20° C. to 175° C., 25° C. to 175° C., 20° C. to 200° C., 25° C. to 200° C., 20° C. to 225° C., 25° C. to 225° C., 20° C. to 240° C., 25° C. to 240° C., 0° C. to 75° C., 0° C. to 100° C., 0° C. to 200° C., 0° C. to 300° C., −40° C. to 100° C., −40° C. to 200° C., or even −40° C. to 300° C.), are different such that, over at least a temperature range 20° C. to 75° C. (in some embodiments, in a range from 25° C. to 100° C., 25° C. to 100° C., 25° C. to 125° C., 25° C. to 150° C., 25° C. to 175° C., 25° C. to 200° C., 25° C. to 210° C., 25° C. to 220° C., 25° C. to 230° C., 25° C. to 240° C., 25° C. to 250° C., 25° C. to 275° C., 25° C. to 300° C.), as current flow increases through the overhead electrical power transmission conductor tension section, wherein the tension of the second overhead electrical power transmission conductor subsection is higher (in some embodiments, at least 1%, 2%, 3%, 4%, 5%, 6%, 7%, 8%, 9%, 10%, or even at least 15%) as compared to the tension of the second overhead electrical power transmission tension subsection under the same conditions when the entire conductor tension section consists of just the conductor of the second overhead electrical power transmission conductor tension subsection; and installing the selected overhead electrical power transmission conductor tension section, wherein the first and second ends of the overhead electrical power transmission conductor tension section are attached to the first and second dead-end towers, respectively, and at least a portion of the sequential overhead electrical power transmission conductor tension subsection is being supported by the suspension tower.

In some embodiments, the first, second, or any additional sequential overhead electrical power transmission conductor tension subsections comprise a composite (e.g., aluminum (including aluminum alloys) and polymeric matrix composites) core. In some embodiments, the first, second, or any additional sequential overhead electrical power transmission conductor tension subsections comprise an Invar (i.e., an iron alloy comprising iron, nickel, and optionally other elements such as chromium, titanium, and carbon, wherein the iron alloy has a thermal expansion coefficient that is less than the linear combination of its constituents) core. In some embodiments, there is at least one (in some embodiments, at least 2, 3, 4, 5, 6, 7, 8, 9, 10, 15, 20, 25, 50, 75, or even at least 100) suspension tower positioned between the first and second dead-end towers.

In another aspect, the present invention provides a dead-end-to-dead-end overhead electrical power transmission line comprising:
  first and second dead-end towers;
  at least one (in some embodiments, at least 2, 3, 4, 5, 6, 7, 8, 9, 10, 15, 20, 25, 50, 75, or even at least 100) suspension tower(s) between the first and second dead-end towers; and
  an overhead electrical power transmission conductor tension section and having a first end attached to the first dead-end tower and a second end attached to the second dead-end tower, the overhead electrical power transmission conductor tension section comprising at least a first and a second sequential overhead electrical power transmission conductor tension subsection, wherein the first overhead electrical power transmission conductor tension subsection has at least one of a composite (e.g., aluminum (including aluminum alloys) and polymeric matrix composites) core or an Invar core, a first coefficient of thermal expansion (e.g., in a range from zero to $25 \times 10^{-6}/°$ C.; in some embodiments in a range from $8 \times 10^{-6}/°$ C. to $20 \times 10^{-6}/°$ C., or even $14 \times 10^{-6}/°$ C. to $20 \times 10^{-6}/°$ C.), a first density (e.g., in a range from 1.4 g/cm$^3$ to 20 g/cm$^3$, in some embodiments, in a range from 2.7 g/cm$^3$ to 3.6 g/cm$^3$, or even in a range from 2.2 g/cm$^3$ to 4.5 g/cm$^3$), a first stress-strain behavior, and a first cross-sectional area, wherein the second overhead electrical power transmission conductor tension subsection has a second coefficient of thermal expansion (e.g., in a range from zero to $25 \times 10^{-6}/°$ C.; in some embodiments in a range from $8 \times 10^{-6}/°$ C. to $20 \times 10^{-6}/°$ C., or even $14 \times 10^{-6}/°$ C. to $20 \times 10^{-6}/°$ C.), a second density (e.g., in a range from 1.4 g/cm$^3$ to 20 g/cm$^3$, in some embodiments, in a range from 2.7 g/cm$^3$ to 3.6 g/cm$^3$, or even in a range from 2.2 g/cm$^3$ to 4.5 g/cm$^3$), a second stress-strain behavior, and a second cross-sectional area, wherein at least one of (a) the first and second coefficients of thermal expansion, (b) the first and second densities, (c) the first and second stress-strain behaviors, or (d) cross-sectional areas, at temperatures in the range from 20° C. to 75° C. (in some embodiments, in a range from 25° C. to 75° C., 20° C. to 100° C., 25° C. to 100° C., 20° C. to 125° C., 25° C. to 125° C., 20° C. to 150° C., 25° C. to 150° C., 20° C. to 175° C., 25° C. to 175° C., 20° C. to 200° C., 25° C. to 200° C., 20° C. to 225° C., 25° C. to 225° C., 20° C. to 240° C., 25° C. to 240° C., 0° C. to 75° C., 0° C. to 100° C., 0° C. to 200° C., 0° C. to 300° C., −40° C. to 100° C., −40° C. to 200° C., or even −40° C. to 300° C.), are different such that, over at least a temperature range 20° C. to 75° C. (in some embodiments, in a range from 25° C. to 100° C., 25° C. to 100° C., 25° C. to 125° C., 25° C. to 150° C., 25° C. to 175° C., 25° C. to 200° C., 25° C. to 210° C., 25° C. to 220° C., 25° C. to 230° C., 25° C. to 240° C., 25° C. to 250° C., 25° C. to 275° C., 25° C. to 300° C.), as current flow increases through the overhead electrical power transmission conductor tension section, wherein the tension of the second overhead electrical power transmission conductor subsection is higher (in some embodiments, at least 1%, 2%, 3%, 4%, 5%, 6%, 7%, 8%, 9%, 10%, or even at least 15%) as compared to the tension of the second overhead electrical power transmission tension subsection under the same conditions when the entire conductor tension section consists of just the conductor of the second overhead electrical power transmission conductor tension subsection.

In some embodiments, the overhead electrical power transmission conductor tension section has a length of at least 100 meters (in some embodiments, at least 200, 300, 400, 500, 600, 700, 800, 900, 1000, 1200, 1500, 1800, 2100, 2400, 2700, 3,000, 5,000, 10,000, 15,000, 20,000, 25,000, or even at least about 30,000 meters). In some embodiments, there is at least one (in some embodiments, at least 2, 3, 4, 5, 6, 7, 8, 9, 10, 15, 20, 25, 50, 75, or even at least 100) suspension tower positioned between the first and second dead-end towers.

Overhead electrical power transmission conductors consisting of aluminum matrix composite cores, for example, are typically desirable for use in electrical power transmission lines because they offer more ampacity than overhead electrical power transmission conductors consisting of, for example, steel core conductors, as well as reduced sag given the same cross sectional area as steel core conductors. As a result, overhead electrical power transmission conductors consisting of aluminum matrix composite cores can be used to increase clearance under a transmission line and/or operate at higher temperature, and thus carry more current. However, since overhead electrical power transmission conductors consisting of aluminum matrix composite cores are typically more expensive than overhead electrical power transmission conductors consisting of steel cores, it may be desirable to use overhead electrical power transmission conductors consisting of aluminum matrix composite cores only on the portions of a tension section that require less sag to maintain the desired or required clearance.

DETAILED DESCRIPTION

Figure 1:
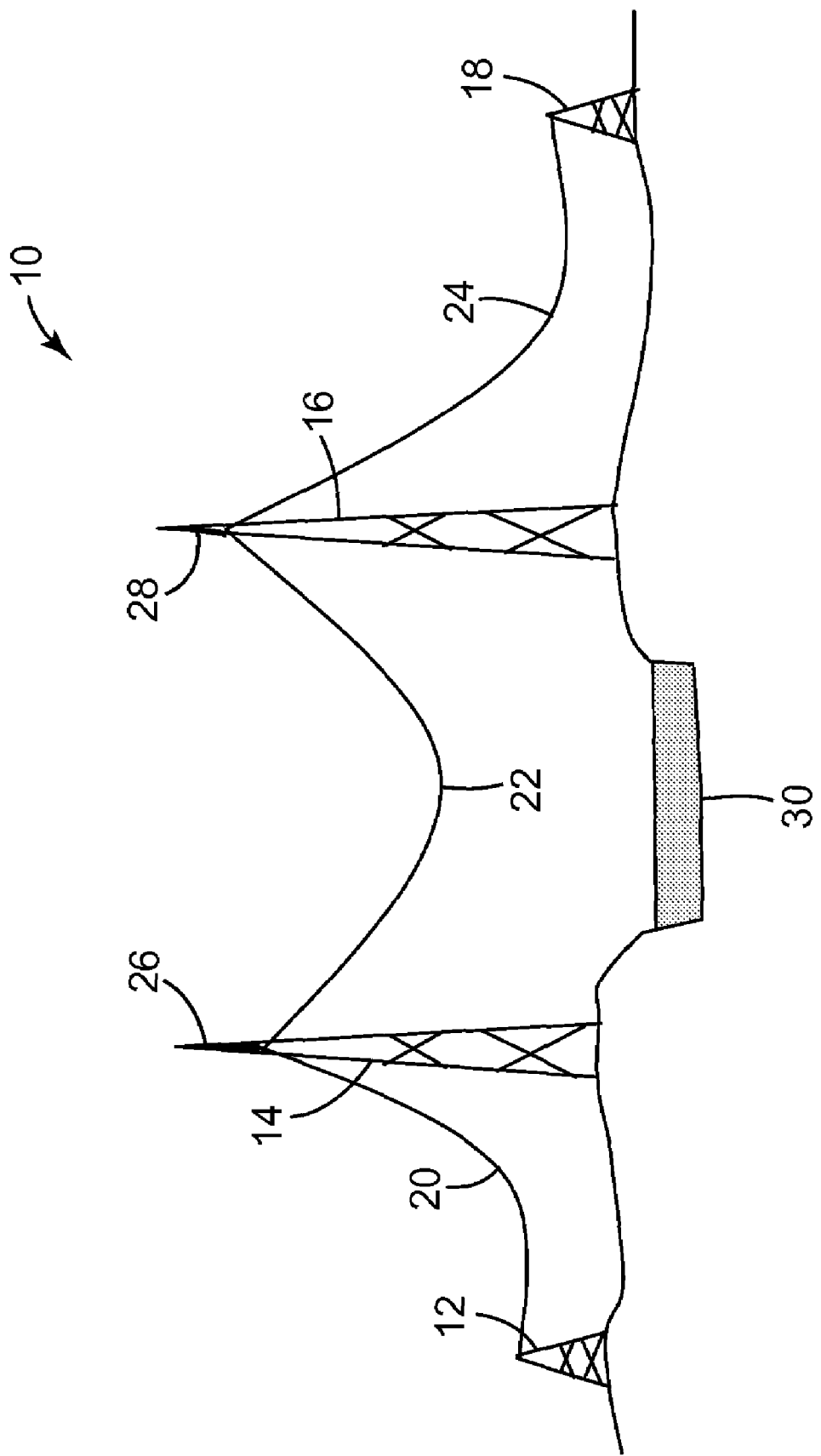
FIG. 1 is an exemplary long span crossing for an overhead electrical power transmission line according to the present invention.

FIG. 1 is a an exemplary long span crossing for overhead electrical power transmission line according to the present invention showing overhead power transmission line 10 crossing river 30 with different conductors 20, 22, and 24. The overhead electrical power transmission line consists of two dead-end towers, 12 and 18, two suspension towers 14 and 16, two insulator strings 26 and 28 connecting the conductor to the suspension towers and three spans of conductors. The spans of conductor 20 and 24 are the same conductor type and the span of conductor 22 is a different conductor type than conductors 20 and 24. The span of conductor 22 is referred to as the crossing span or the limiting span. The spans of conductor 20 and 24 are referred to as the non-limiting spans.

The distance between two dead-end towers is referred to as a tension section. The distance between two adjacent towers, either suspension or dead-end towers, is referred to as a span. A tension subsection is some portion of the transmission line tension section that includes only one type of conductor. This tension subsection may cover more or less than one span between two adjacent towers, and two different tension subsections may meet within a span or at a tower. A conductor configuration defines the multiple tension subsections of the transmission line tension section (e.g., how much of the transmission line tension section is made up of each conductor type). As an example, two tension subsections that make up a portion of the overhead power transmission line may meet within a span or at the attachment point to a tower.

A number of accessories are known in the art and used to facilitate the connection of conductor sections and attaching the conductor to the towers. For example, terminations (also called "dead-ends") and joints (also called "mid-span splices" or full-tension splices/joints) are commercially available, for example, from Alcoa Conductor Accessories (ACA), Spartanburg, S.C. and Preformed Line Products (PLP), Cleveland, Ohio. Although the specific construction of the conductors will depend on the desired characteristics of the overall tension section, typically, the dead-end accessories connect the conductor to the towers.

The dead-end towers (structures) allow for generally no longitudinal movement of the conductor. In between the dead-end structures, suspension structures support the conductor vertically. The conductor is connected to the suspension tower via an insulator string (typically strung-together insulated ceramic discs). One end of the insulator string is attached to the suspension tower and the other end of the insulator string is attached to the conductor. This latter attachment is referred to as the conductor attachment point. As changes in tension occur in the conductor, the insulator string, pivoting around the suspension tower attachment site, will pull on the conductor and longitudinally move the conductor attachment point to balance the ensuing forces. This movement is referred to as insulator swing. Changes in conductor tension between spans on a suspension tower are normally equalized by insulator swing. The insulator swings from the lower-tension span towards the higher-tension span to equalize the tension between spans. This causes the tension to drop in the higher-tension span increasing sag in that span.

In conventional designs where the same conductor is installed on equal length spans on both sides of the suspension tower, the change in tension will be the same for both conductors and the conductor attachment point will not move. If one span is longer than another, the tension will decrease faster in the short span. The conductor attachment point will then move towards the longer span.

Typically a single type of conductor is used for the entire tension section, from one dead-end to the other. If the tension section is a long span crossing, then the crossing span is typically the limiting span. That is, as the conductor heats up, the crossing span will be the first to reach maximum allowable sag. It is sometimes desirable to use different sizes, constructions and/or materials of conductors for these long span crossings. For example, it may be desirable to replace an existing long span crossing with a smaller conductor made of high performance materials, such as aluminum matrix composite conductor reinforced ("ACCR"), discussed further below. Although the replacement conductor may be smaller than the existing conductor it may be able to transmit more power by operating at a higher temperature than the existing conductor. This improved performance could be achieved by replacing the entire tension section from dead-end to-dead-end with this one type of conductor.

Surprising it has been discovered that by selecting a different type conductor on the non-limiting spans from that used on the limiting span such as in FIG. 1, even better performance can be achieved than by just using one type of conductor. With the exemplary overhead electrical power transmission line according to the present invention shown in FIG. 1, lower temperature, larger, and heavier conductor made of inexpensive materials can be used on the non-limiting spans, while a smaller, light-weight conductor made of high performance, relatively higher cost materials can be used on the limiting span. This type of conductor configuration would be desirable in a retrofit when the total mechanical loads of the combination of new and existing conductors does not exceed the design loads of the structures and the required or desired clearances on all of the spans are maintained.

The use of different types of conductors on an overhead electrical power transmission line can be desirable, for example, because of cost (i.e., less expensive conductors could be used as well, rather than using the high performance material on the entire tension section) and performance (i.e., combinations of conductors could be chosen to produce higher performance than could be achieved with a single type of conductor). The desirable performance may take the form, for example, of increased clearance compared to a conventional design with a single conductor type, increased current carrying capacity compared to a conventional design with a single type of conductor, or decreased structure or conductor mechanical loads compared to a conventional design with a single conductor type. A combination of these desirable performance attributes may also be achieved.

Figure 2:
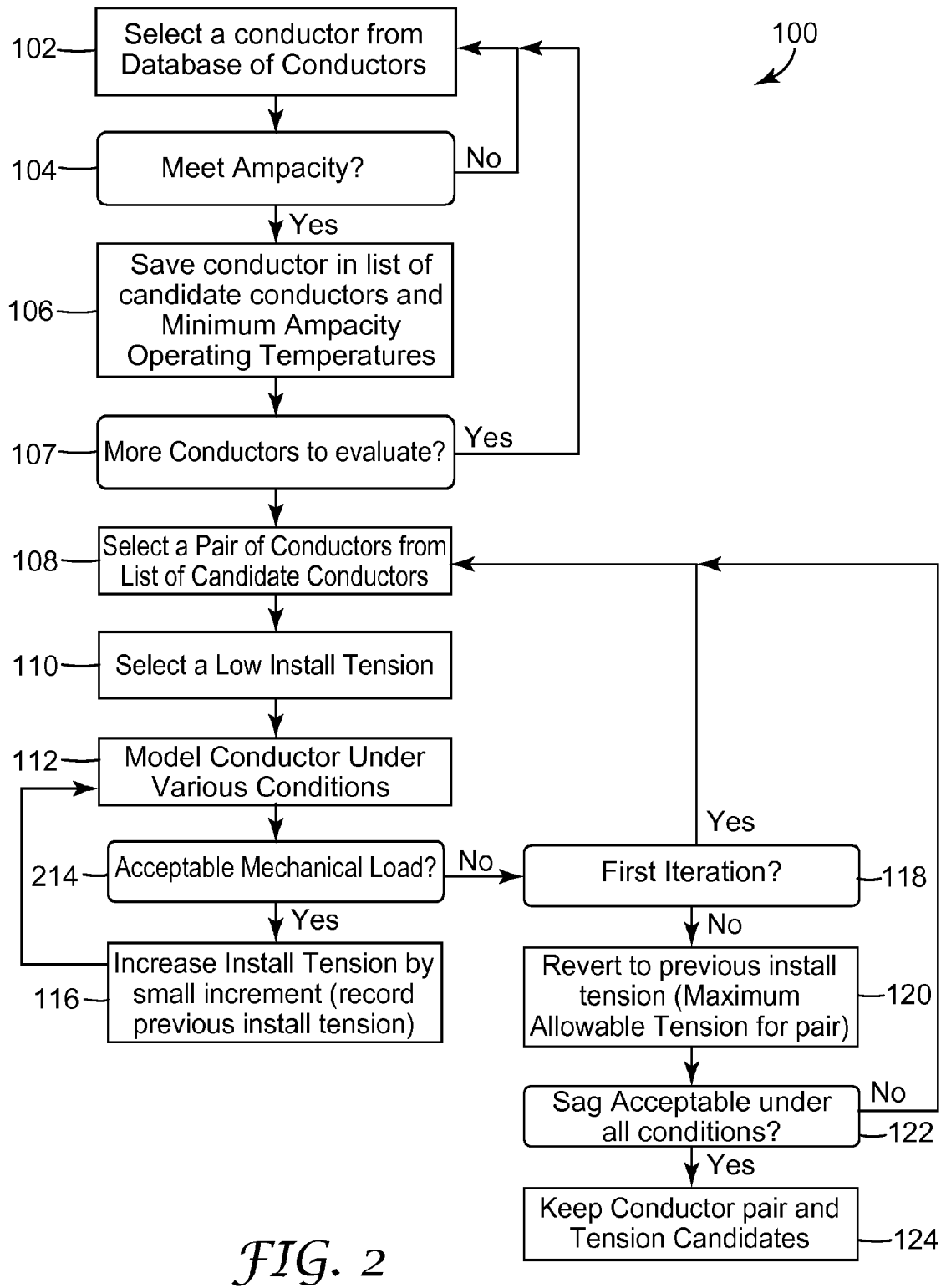
FIGS. 2 and 3 are flow diagrams illustrating exemplary processes for selecting an appropriate conductor configuration for an overhead electrical power transmission line.

It may be desirable to select different conductors for a particular transmission line, or a portion thereof (e.g., a river crossing, a highway crossing, or crossing of some other topographical feature). FIG. 2 is a flow chart illustrating exemplary process 100 for selecting conductors, and the installation tensions that will produce the minimum sag for use in a selected overhead power transmission line. In step 102, a conductor is selected from a database of conductors to identify a conductor that will meet ampacity requirements (step 104). The maximum operating temperature is recorded for the selected conductor at the required ampacity. If the conductor does not meet the ampacity necessary for the overhead power transmission line, another conductor is selected from the database. If the conductor does meet the ampacity, the conductor is saved in a list of candidate conductors, and the minimum ampacity operating temperature for the conductor is recorded (step 106). In step 107, the list of conductors is examined and if more conductors are needed, additional iterations of steps 102 through 106 are conducted. If no additional conductors are necessary for evaluation, then in step 108, at least a pair of conductors is selected from the list of candidate conductors, and a low installation tension is selected (step 110), for example, 8% of the breaking strength of the weaker conductor.

A model of the tension section given the installation tension can be created, and the unstressed length of conductors for each span is calculated. For simplicity, it may be assumed that the different types of conductors are installed with the same tension, and that the associated suspension insulator strings are initially vertical. Offset clipping (i.e., non-vertical insulator strings) of conductors may be desired, and can be incorporated into the model. Next, the conductors' mechanical behavior (including tension) under various conditions, as required by accepted engineering practice (e.g., extreme cold, ice and wind loading), are modeled (step 112). The mechanical loads from this model are evaluated in step 114. If the mechanical loads are found to not be acceptable on the first iteration of the install tension, then step 108 is repeated, and a different set of conductors is selected. If the mechanical loads are found acceptable, then the install tension is increased by a small increment (e.g., about ION) (step 116), and the conductors' mechanical behavior is modeled (step 112), rechecking for undesired mechanical load. If in step 114, the mechanical load is not acceptable, and this is not the first iteration of the installed tension (step 118), then revert (step 120) to the previous installed tension from step 116. The results of the modeling using the maximum allowable tension can be used to evaluate the sag for each span, and determine if the design sag requirement has been met (step 122). If the sag is acceptable, then that combination of conductors and tension can be preserved as a candidate (step 124). If the sag is not acceptable, then that combination of conductors can be discarded, and step 108 is repeated to select a different set of conductors.

Step 108 can be reiterated multiple times, as needed, with different sets of conductors until a variety, in some cases all combinations, have been evaluated. After the various combinations have been evaluated, the user can review all candidate combinations saved in step 124 and determine which has the most useful (including the most desirable or the best) properties for the application, for example, the combinations having the least sag in a long span crossing.

Figure 3:
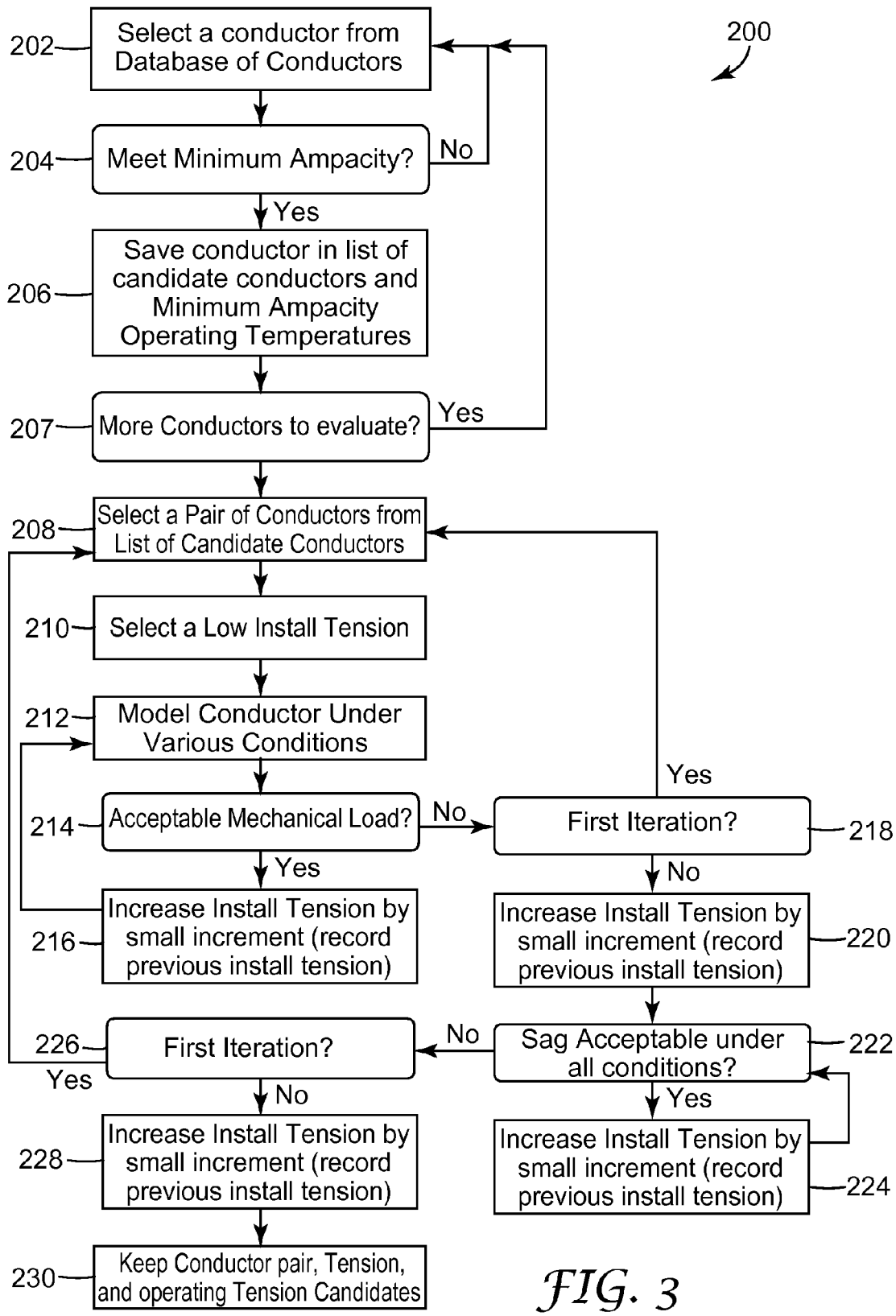

Process 100 can be modified to identify the combinations of conductors to satisfy various design objectives (e.g., to produce greatest current flow or the least cost). For example, FIG. 3 shows a flow chart for an exemplary process for determining combinations of conductors that will produce the greatest ampacity. The process is similar to that in FIG. 2, except that additional iterations are added to identify the maximum allowable operating conductor temperatures of the candidate conductors. Referring to FIG. 3, exemplary process 200 for selecting conductors, and the installation tensions that will produce the maximum ampacity for use in a selected overhead power transmission line is shown. In step 202, a conductor is selected from a database of conductors to identify a conductor that will meet minimum ampacity requirements (step 204). The operating temperature is recorded for the selected conductor at the required minimum ampacity. If the conductor does not meet the minimum ampacity necessary for the overhead power transmission line, another conductor is selected from the database. If the conductor does meet the minimum ampacity, the conductor is saved in a list of candidate conductors, and the minimum ampacity operating temperature for the conductor is recorded (step 206). In step 207, the list of conductors is examined and if more conductors are needed, additional iterations of steps 202 through 206 are conducted. If no additional conductors are necessary for evaluation, then in step 208, at least a pair of conductors is selected from the list of candidate conductors, and a low installation tension is selected (step 210), for example, 8% of the breaking strength of the weaker conductor.

A model of the tension section given the installation tension can be created, and the unstressed length of conductors for each span is calculated. For simplicity, it may be assumed that the different types of conductors are installed with the same tension, and that the associated suspension insulator strings are initially vertical. Offset clipping (i.e., non-vertical insulator strings) of conductors may be desired, and can be accommodated. Next, the conductors' mechanical behavior (including tension) under various conditions, as required by accepted engineering practice (e.g., extreme cold, ice and wind loading), are modeled (step 212). The mechanical loads from this model are evaluated in step 214. If the mechanical loads are found to not be acceptable on the first iteration of the install tension, then step 108 is repeated, and a different set of conductors is selected. If the mechanical loads are found acceptable, then the tension is increased by a small increment (step 216), and the conductors' mechanical behavior is modeled (step 212), rechecking for undesired load. If in step 214, the mechanical load is not acceptable, and this is not the first iteration of the installed tension (step 218), then revert (step 220) to the previous installed tension from step 216. The results of the modeling using the maximum allowable tension can be used to evaluate the sag for each span, and determine if the design sag requirement has been met (step 222). If the sag is not acceptable and this is the first iteration of evaluating sag (step 226), then that combination of conductors can be discarded, and step 208 repeated to select a different set of conductors. If the sag is acceptable, then new operating temperatures are calculated for a small increase in current (e.g., about 5 amperes) (step 224). Given these new operating temperatures, the sag is reevaluated. This process of incrementing current and reevaluating sag is repeated until the sag is no longer acceptable. The last combination of conductors and current with acceptable sag (step 228) can be preserved as a candidate (step 230).

Step 208 can be reiterated multiple times, as needed, with different sets of conductors until a variety, in some cases all combinations, have been evaluated. After the various combinations have been evaluated, the user can review all candidate combinations saved in step 230 and determine which has the most useful (including the most desirable or the best) properties for the application for example, in a long span crossing, greatest ampacity.

Different inputs that may go into the decision making process to identify possible pairs of conductors that will provide a beneficial combination include: a database of conductor properties which holds data defining conductors and operating parameters of conductors, (in particular, this conductor database comprises the exemplary data noted in Table 1, below, for each conductor to be evaluated), the lengths of the spans for the tension section, the attachment point heights for existing, and/or planned towers and insulators, the length of suspension insulator strings for existing and/or planned structures, the clearance requirements (typically provided by the applicable electrical code), the weather conditions for ampacity calculation (e.g., the type of data given in Table 2, below; these are the weather conditions that are used to determine the current carrying capacity of a conductor given an operating temperature, or alternatively the operating temperature given a current load).

TABLE 1

Cross section area
Outer diameter
Unit weight
Ultimate tension
Final modulus of elasticity
Thermal expansion coefficient
Resistance at 25° C.
Resistance at 75° C.
Emissivity coefficient
Solar absorption coefficient TABLE 1-continued Outer strands heat capacity
Core heat capacity

TABLE 2

Latitude
Atmosphere
Sun time
Line azimuth
Air temperature
Wind speed
Wind direction to conductor
Conductor elevation
Steady-state current The heavy weather loads are the conditions used by transmission line designers to represent the worst weather that a transmission line is likely to experience. These weather conditions typically include the highest wind speed, coldest temperature and heaviest ice load. Often combinations of cold air temperature, ice, and wind are considered as well. The allowable conductor loads, which are generally prescribed by structural or electrical code, engineering practice or the electrical transmission utility, may be in terms of absolute conductor tension (e.g., 12,000 lbs (53,376 N)) or, for example, in terms of percent of the rated breaking strength of the conductor (e.g., 40% of rated breaking strength). The allowable tower loads are typically prescribed based on the structural capacity of the existing and/or proposed towers. The allowable insulator swings are typically prescribed based on the transmission line voltage, tower design and insulator string size.

Figure 4:
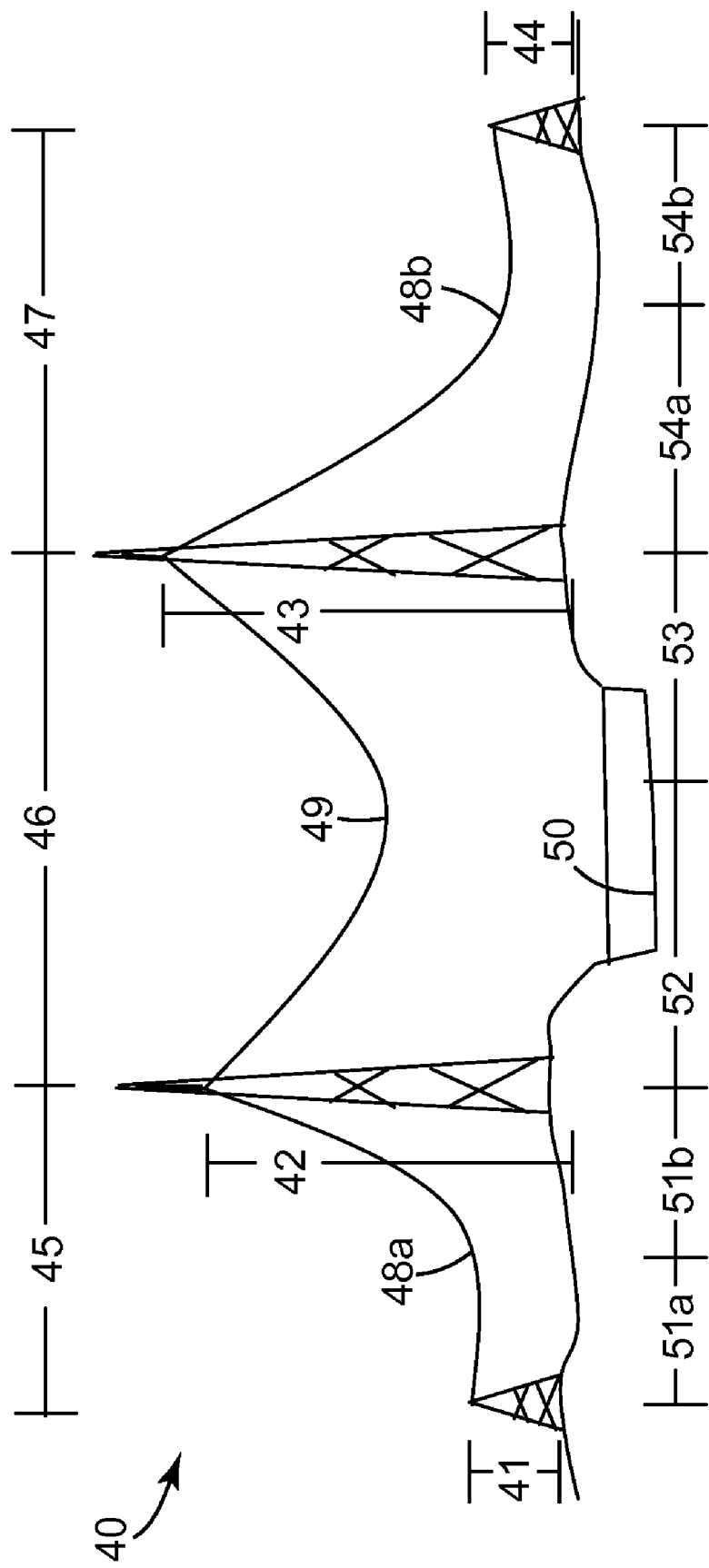
FIG. 4 is an exemplary overhead electrical power transmission line according to the present invention depicting variables described in Equation 1.

To determine if the sags, tension and insulator swings are acceptable, the overhead power transmission line can be modeled, and sag, tension, and insulator swing determined. Referring to FIG. 4, an exemplary overhead electrical power transmission line according to the present invention 40 is shown crossing river 50 with three spans of different adjacent conductors 48a (left span), 49 (central span), and 48b (right span), illustrating the different variables of the overhead power transmission line.

Equation 1 below is an example of a mathematical matrix for a three span configuration depicted in FIG. 4, where conductors 48a and 48b are identical and conductor 49 is different than conductors 48a and 48b.

48a/b in mass/unit length, $W_c$ is the weight of conductor 49 in mass/unit length, $\alpha_s$ is the thermal expansion coefficient for conductor 48a/b, $\alpha_c$ is the thermal expansion coefficient for conductor 49, $E_s$ is the elastic modulus for conductor 48a/b, $E_s$ is the elastic modulus for conductor 49, $\Delta_{Ts}$ is the temperature change in conductor 48a/b from zero stress state, $\Delta_{Tc}$ is the temperature change in conductor 49 from zero stress state, $L_1$ is the unstressed length of conductor on span 45, $L_2$ is the unstressed length of conductor on span 46, $L_3$ is the unstressed length of conductor on span 47, $\theta_1$ is the angle that the insulator moves from normal (i.e., perpendicular to the horizon) clockwise on the second tower, and $\theta_2$ the angle that the insulator moves from normal (i.e., perpendicular to the horizon) clockwise on the third tower.

Equation 1 represents an exemplary method for determining parameters such as conductor tension, and insulator swing for a change in operating temperature for the exemplary three span crossing shown in FIG. 4. Given the results of Equation 1, the sag of each span, which occurs after an operating temperature change, can be determined. Such calculations are used to determine the suitability of the conductor pair for a particular application. In addition, the designer of the conductor configuration typically performs similar calculations for the most extreme weather that the overhead power transmission line is expected to experience. As discussed above, typically, these weather conditions include the highest wind speed, coldest temperature and heaviest ice load. Often combinations of cold air temperature, ice, and wind are considered as well. These calculations can be done, for example, by modifying Equation 1 such that the conductor operating temperatures are the given air temperatures, and using "resultant weights" due to wind and ice loads in place of conductor weights. The calculation of resultant weight can be found in Overhead Conductor Manual, 1994, Southwire Company, Carrollton, Ga.

The first three rows of Equation 1 represent the fact that the horizontal distance between attachment points equals the initial span length minus the effect of insulator swing, for the left, central, and right spans, respectively. The fourth through sixth rows of Equation 1 are simplified catenary equations for the left, central and right spans, respectively, although it may be desirable in some instances to use more precise catenary equations. The seventh through ninth rows of Equation 1 represent the fact that the conductor length must be the unstressed length plus the elongation due to mechanical and thermal strain, for the left, central and right spans, respectively.

$$\begin{Bmatrix} D_1 + D_2 - S_2 - L_{ins}(\theta_1 - \theta_2) \\ D_{b1} + D_{b2} - S_1 + L_{ins}\theta_1 \\ D_{a1} + D_{a2} - S_3 - L_{ins}\theta_2 \\ W_s(D_{a2}^2 - D_{a1}^2)/(2T_h) + H_3 - H_4 \\ W_s(D_{b2}^2 - D_{b1}^2)/(2T_h) + H_1 - H_2 \\ W_c(D_2^2 - D_1^2)/(2T_h) + H_2 - H_3 \\ D_{b1} + D_{b2} + (D_{b1}^3 + D_{b2}^3)W_s^2/(6T_h^2) - L_1(1 + T_h/E_s + \alpha_s\Delta_{Ts}) \\ D_1 + D_2 + (D_1^3 + D_2^3)W_c^2/(6T_h^2) - L_2(1 + T_h/E_c + \alpha_c\Delta_{Tc}) \\ D_{a1} + D_{a2} + (D_{a1}^3 + D_{a2}^3)W_s^2/(6T_h^2) - L_3(1 + T_h/E_s + \alpha_s\Delta_{Ts}) \end{Bmatrix} = \begin{Bmatrix} 0 \\ 0 \\ 0 \\ 0 \\ 0 \\ 0 \\ 0 \\ 0 \\ 0 \end{Bmatrix}$$

Equation 1

Where: $L_{ins}$ is the length of insulator strings, $T_h$ is the horizontal component of tension, $W_s$ is the weight of conductor Referring to Table 3 (below), Equation 1 variables are described and referenced with respect to FIG. 4.

TABLE 3

| FIG. 4 Number | Corresponding Variable in Equation 1 | Description |
|---|---|---|
| 41 | $H_1$ | height of conductor attachment point on first tower |
| 42 | $H_2$ | height of conductor attachment point on second tower |
| 43 | $H_3$ | height of conductor attachment point on third tower |
| 44 | $H_4$ | height of conductor attachment point on fourth tower |
| 45 | $S_1$ | Length of span |
| 46 | $S_2$ | Length of span |
| 47 | $S_3$ | Length of span |
| 51a | $D_{a1}$ | Horizontal distance from first tower to low point on conductor |
| 51b | $D_{a2}$ | Horizontal distance low point on conductor to first tower |
| 52 | $D_1$ | Horizontal distance from second tower to low point on conductor |
| 53 | $D_2$ | Horizontal distance low point on conductor to third tower |
| 54a | $D_{b1}$ | Horizontal distance from third tower to low point on conductor |
| 54b | $D_{a2}$ | Horizontal distance low point on conductor to fourth tower |

Equation 1 can be solved by several methods known in the art, including, the well known Newton-Raphson iterative solution technique (*Numerical Recipes in Fortran* $2^{nd}$ *Ed.*, Press, W. H., Saul, A. T., Vetterling, W. T., Flannery, B. P., 1992 Cambridge University Press, New York, N.Y.). Equation 1 assumes a simple linear model for conductor thermomechanical behavior. This linear behavior was chosen for simplicity. However, the use of more sophisticated models, nonlinear models, of conductor behavior by a similar method may also be used, and may be desirable, for example, for high temperature conductors, like ACCR. Additionally, Equation 1 makes further simplifying assumptions, such as the horizontal components of tension are the same for each conductor. Those skilled in the art will recognize that the formulation represented by Equation 1 can be readily extended to any of a variety of spans and/or conductors types. Also, those skilled in the art will recognize that alternate formulation methods, such as the finite element method may be employed to represent the behavior of the same conductor configuration, and achieve a similar solution.

The stress-strain behavior of a conductor can be determined by techniques known in the art (e.g., it may represented by a simple linear modulus, or by the more complex, and well known polynomial stress-strain curves used in the several types of transmission line design software (e.g., software available from ACA Conductor Accessories, Spartanburg, S.C. under the trade designation "SAG 10", from Powerline Systems, Madison, Wis. under the trade designation "PLS CADD", the contents of which are incorporated herein by reference)).

As mentioned earlier, tension sections of transmission lines are designed to maintain desired or required clearances at all times. To ensure adequate clearance under all weather and electrical loadings, the sag behavior of the conductor is incorporated into the overhead power transmission line design. Sag tension calculations are used to predict the sag behavior of the conductor under varying conditions. These sag tension calculations are normally done numerically using different loading conditions and characteristics of the line. One important loading condition is the sag and tension of the conductor at different operating temperatures. As more current is transmitted through a conductor its temperature increases due to "$I^2R$" resistive losses and it elongates due to the thermal expansion of the materials. As the conductor elongates the tension in the span decreases and the conductor's sag increases. A common, simplified equation for sag is represented by Equation 2, below.

$$sag = \frac{wS^2}{8T_h} \quad \text{Equation 2}$$

Where: w is the weight/unit length of conductor, S is the span length, and $T_h$ is the horizontal component of tension. Equation 2 is solved for sag using the results obtained from Equation 1.

In some exemplary embodiments, each of the overhead electrical power transmission tension subsections utilized in the practice of the present invention are at least about 100 meters in length, although other lengths are contemplated. In some embodiments, each of overhead electrical power transmission tension subsections are at least about 200, 300, 400, 500, 600, 700, 800, 900, 1000, 2000, 3000, 4000, 5000, 6000, 7000, 8000, 9000, 10,000, 15,000, 20,000, or even at least about 25,000 meters in length.

Exemplary overhead electrical power transmission conductors for overhead electrical power transmission tension subsections include overhead electrical power transmission cables having cores comprising at least one of a composite (e.g., aluminum matrix composite and polymeric composite) wire(s), Invar wire(s), steel wire(s), polymeric (e.g., aramid and poly(p-phenylene-2,6-benzobisoxazole)) material (e.g., polymeric wires), ceramic, boron, graphite, carbon, titanium (e.g., wire(s)), tungsten (e.g., wire(s)), and/or shape memory alloy (e.g., wire(s)), and combinations thereof. Typically, aluminum wires, copper wires, aluminum alloy wires, and/or copper alloy wires are stranded around the cores. One exemplary composite core overhead electrical power transmission cable comprises an aluminum matrix composite core, and aluminum wires, copper wires, aluminum alloy wires, and/or copper alloy wires are stranded around the core. A conductor having an aluminum matrix composite core is sometimes referred to as aluminum conductor composite reinforced ("ACCR").

In some embodiments, a composite core utilized in the present invention comprises at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) of a continuous, elongated composite (e.g., wire) or Invar (e.g., wire). In some embodiments, a composite core utilized in the present invention has a cross-sectional area, wherein the core comprises at least 5 (in some embodiments, 10, 15, 20, 25, 30, 35, 40, 45, 50, 55, 60, 65, 70, 75, 80, 85, 90, 95, or even 100) percent of the core cross-sectional area is composite (e.g., wire(s)) or Invar (e.g., wire(s)). In some embodiments, a core utilized in the present invention comprising at least one of a composite or an Invar comprising core further comprises steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof.

In some embodiments, the first and/or second (or other, additional) sequential overhead electrical power transmission conductor tension subsection is free of composite, and has a core comprising steel wires, polymeric (e.g., aramid and poly (p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core of such first and/or second (or other, additional) sequential overhead electrical power transmission conductor tension subsection comprises at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core of this second sequential overhead electrical power transmission conductor tension subsection has a cross-sectional area, wherein at least 5 (in some embodiments, 10, 15, 20, 25, 30, 35, 40, 45, 50, 55, 60, 65, 70, 75, 80, 85, 90, 95, or even 100) percent of the core cross-sectional area is steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof.

In some embodiments, the dead-end-to-dead-end overhead electrical power transmission conductor according to the present invention further comprises at least one additional (in some embodiments, at least 2, 3, 4, 5, 6, 7, 8, 9, 10, 20, 30, 40, 50, 60, 70, 80, 90, 100 or even more) overhead electrical power transmission conductor tension subsections. In some embodiments, the additional overhead electrical power transmission conductor tension subsection(s) can be independently, a composite core comprising at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) composite wire. In some embodiments, the additional overhead electrical power transmission conductor tension subsection(s) can be independently a composite core comprising at least 5 (in some embodiments, 10, 15, 20, 25, 30, 35, 40, 45, 50, 55, 60, 65, 70, 75, 80, 85, 90, 95, or even 100) percent of the cross-sectional area of the core is composite (e.g., wire(s)), or a core free of composite and comprising steel wires, Invar (e.g., wire(s)), polymer (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core(s) of the additional overhead electrical power transmission conductor tension subsection comprising a composite in the core also comprises steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core(s) of the additional overhead electrical power transmission conductor tension subsection(s) is free of composite in the core and comprises at least one of (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) steel wires, polymer material (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, at least 5 (in some embodiments, 10, 15, 20, 25, 30, 35, 40, 45, 50, 55, 60, 65, 70, 75, 80, 85, 90, 95, or even 100) percent of the cross-sectional area of the additional tension subsection core is steel wires, polymer (e.g., aramid and poly(p-phe-nylene-2,6-benzobisoxazole)) fibers, ceramic fibers, boron fibers, graphite fibers, carbon fibers, titanium wires, tungsten wires, shape memory alloy wires, and combinations thereof.

Exemplary overhead electrical power transmission conductors for tension subsections utilized in the present invention include: aluminum conductor steel reinforced (ACSR), thermal-resistant aluminum alloy conductor steel reinforced (TACSR), ultra thermal-resistant aluminum alloy conductor steel reinforced (ZTACSR), ultra thermal-resistant aluminum alloy conductor Invar reinforced (ZTACIR), heat resistant aluminum alloys (ZTAL), ultra thermal-resistant aluminum alloy conductor steel reinforced (ZTACSR), extra thermal-resistant aluminum alloy conductor steel reinforced (XTACSR), extra thermal-resistant aluminum alloy conductor Invar reinforced (XTACIR), gap type ultra thermal resistant aluminum alloy steel reinforced (GZTACSR), high strength thermal resistant aluminum alloy conductor steel reinforced (KTACSR), all aluminum conductor (AAC), all aluminum alloy conductor (AAAC), aluminum conductor composite core (ACCC), and aluminum conductor steel supported (ACSS).

Wires for stranding around a core to provide a conductor utilized in the practice of the present invention are known in the art. Aluminum wires are commercially available, for example, from Nexans, Weybum, Canada or Southwire Company, Carrollton, Ga. under the trade designations "1350-H19 ALUMINUM" and "1350-H0 ALUMINUM". Typically, aluminum wire have a thermal expansion coefficient in a range from about $20\times10^{-6}$/° C. to about $25\times10^{-6}$/° C. over at least a temperature range from about 20° C. to about 500° C. In some embodiments, aluminum wires (e.g., "1350-H19 ALUMINUM") have a tensile breaking strength, at least 138 MPa (20 ksi), 158 MPa (23 ksi), 172 MPa (25 ksi), 186 MPa (27 ksi) or even at least 200 MPa (29 ksi.). In some embodiments, aluminum wires (e.g., "1350-H0 ALUMINUM") have a tensile breaking strength greater than 41 MPa (6 ksi) to no greater than 97 MPa (14 ksi), or even no greater than 83 MPa (12 ksi). Aluminum alloy wires are commercially available, for example, from Sumitomo Electric Industries, Osaka, Japan under the trade designation "ZTAL", or Southwire Company, Carrollton, Ga., under the designation "6201". In some embodiments, aluminum alloy wires have a thermal expansion coefficient in a range from about $20\times10^{-6}$/° C. to about $25\times10^{-6}$/° C. over at least a temperature range from about 20° C. to about 500° C. Copper wires are commercially available, for example, from Southwire Company, Carrollton, Ga. Typically, copper wires have a thermal expansion coefficient in a range from about $12\times10^{-6}$/° C. to about $18\times10^{-6}$/° C. over at least a temperature range from about 20° C. to about 800° C. Copper alloy (e.g., copper bronzes such as Cu—Si—X, Cu—Al—X, Cu—Sn—X, Cu—Cd; where X=Fe, Mn, Zn, Sn, and/or Si; commercially available, for example, from Southwire Company, Carrollton, Ga.; oxide dispersion strengthened copper available, for example, from OMG Americas Corporation, Research Triangle Park, N.C., under the designation "GLIDCOP") wires. In some embodiments, copper alloy wires have a thermal expansion coefficient in a range from about $10\times10^{-6}$/° C. to about $25\times10^{-6}$/° C. over at least a temperature range from about 20° C. to about 800° C. The wires may be in any of a variety shapes (e.g., circular, elliptical, and trapezoidal).

Suitable overhead electrical power transmission conductors for overhead electrical power transmission tension subsections having cores comprising an aluminum matrix composite wire(s) can be made by techniques known in the art. Examples of suitable continuous (i.e., having a length that is relatively infinite when compared to the average fiber diameter) ceramic fibers for the cores of the ACCR overhead electrical power transmission conductors include glass, silicon carbide fibers, and ceramic oxide fibers. Typically, the ceramic fibers are crystalline ceramics (i.e., exhibits a discernible X-ray powder diffraction pattern) and/or a mixture of crystalline ceramic and glass (i.e., a fiber may contain both crystalline ceramic and glass phases), although they may also be glass. In some embodiments, the fiber is at least 50 (in some embodiments, at least 55, 60, 65, 70, 75, 80, 85, 90, 95, 96, 97, 98, 99, or even 100) percent by weight crystalline. Examples of suitable crystalline ceramic oxide fibers include refractory fibers such as alumina fibers, aluminosilicate fibers, aluminoborate fibers, aluminoborosilicate fibers, zirconia-silica fibers, and combinations thereof.

In some embodiments of the cores of the ACCR overhead electrical power transmission conductors, it is desirable for the fibers to comprise at least 40 (in some embodiments, at least 50, 60, 65, 70, 75, 80, 85, 90, 95, 96, 97, 98, 99, or even 100) percent by volume $Al_2O_3$, based on the total volume of the fiber. In some embodiments, it is desirable for the fibers to comprise in a range from 40 to 70 (in some embodiments, in a range from 55 to 70, or even 55 to 65) percent by volume $Al_2O_3$, based on the total volume of the fiber.

Further, exemplary glass fibers are available, for example, from Corning Glass, Corning, N.Y. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Alumina fibers are described, for example, in U.S. Pat. No. 4,954,462 (Wood et al.) and U.S. Pat. No. 5,185,299 (Wood et al.). In some embodiments, the alumina fibers are polycrystalline alpha alumina fibers, and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than 1 micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa), as determined according to the tensile strength test described in U.S. Pat. No. 6,460,597 (McCullough et al.). Exemplary alpha alumina fibers are marketed under the trade designation "NEXTEL 610" by 3M Company, St. Paul, Minn.

Aluminosilicate fibers are described, for example, in U.S. Pat. No. 4,047,965 (Karst et al.). Exemplary aluminosilicate fibers are marketed under the trade designations "NEXTEL 440", "NEXTEL 550", and "NEXTEL 720" by 3M Company.

Aluminumborate and aluminoborosilicate fibers are described, for example, in U.S. Pat. No. 3,795,524 (Sowman). Exemplary aluminoborosilicate fibers are marketed under the trade designation "NEXTEL 312" by 3M Company.

Zirconia-silica fibers are described, for example, in U.S. Pat. No. 3,709,706 (Sowman).

Typically, the continuous ceramic fibers have an average fiber diameter of at least about 5 micrometers, more typically, in a range from about 5 micrometers to about 20 micrometers; and in some embodiments, in a range from about 5 micrometers to about 15 micrometers.

Typically, the ceramic fibers are in tows. Tows are known in the fiber art and typically include a plurality of (individual) generally untwisted fibers (typically at least 100 fibers, more typically, at least 400 fibers). In some embodiments, tows comprise at least 780 individual fibers per tow, and in some cases, at least 2600 individual fibers per tow, or at least 5200 individual fibers per tow. Tows of various ceramic fibers are available in a variety of lengths, including 300 meters, 500 meters, 750 meters, 1000 meters, 1500 meters, and longer. The fibers may have a cross-sectional shape that is circular, elliptical, or dogbone.

Exemplary boron fibers are commercially available, for example, from Textron Specialty Fibers, Inc. of Lowell, Mass. Typically, such fibers have a length on the order of at least 50 meters, and may even have lengths on the order of kilometers or more. Typically, the continuous boron fibers have an average fiber diameter in a range from about 80 micrometers to about 200 micrometers. More typically, the average fiber diameter is no greater than 150 micrometers, most typically in a range from 95 micrometers to 145 micrometers. In some embodiments, the boron fibers have an average tensile strength of at least 3 GPa, and or even at least 3.5 GPa. In some embodiments, the boron fibers have a modulus in a range from about 350 GPa to about 450 GPa, or even in a range from about 350 GPa to about 400 GPa.

Further, exemplary silicon carbide fibers are marketed, for example, by COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Exemplary silicon carbide monofilament fibers are marketed, for example, by Specialty Materials, Inc., Lowell, Mass. under the trade designation "SCS-9", "SCS-6", and "Ultra-SCS".

Exemplary aluminum metals for matrix are highly pure (e.g., greater than 99.95%) elemental aluminum or alloys of pure aluminum with other elements, such as copper. Typically, the aluminum matrix material is selected such that the matrix material does not significantly chemically react with the fiber (i.e., is relatively chemically inert with respect to fiber material), for example, to eliminate the need to provide a protective coating on the fiber exterior.

In some embodiments, the aluminum matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight aluminum and up to 2 percent by weight copper. In some embodiments, useful aluminum alloys are 1000, 2000, 3000, 4000, 5000, 6000, 7000 and/or 8000 series aluminum alloys (Aluminum Association designations). Although higher purity aluminum tends to be desirable for making higher tensile strength wires, less pure forms of metals are also useful.

Suitable aluminum is available, for example, under the trade designation "SUPER PURE ALUMINUM; 99.99% Al" from Alcoa, Pittsburgh, Pa. Aluminum alloys (e.g., Al-2% by weight Cu (0.03% by weight impurities)) can be obtained, for example, from Belmont Metals, New York, N.Y.

The composite cores and wires typically comprise at least 15 percent by volume (in some embodiments, at least 20, 25, 30, 35, 40, 45, or even 50 percent by volume) of the fibers, based on the total combined volume of the fibers and aluminum matrix material. More typically the composite cores and wires comprise in the range from 40 to 75 (in some embodiments, 45 to 70) percent by volume of the fibers, based on the total combined volume of the fibers and aluminum matrix material.

Typically the average diameter of the core is in a range from about 3 mm to about 40 mm. In some embodiments, the average diameter of core desirable is at least 10 mm, at least 15 mm, 20 mm, or even up to about 25 mm (e.g., 10 mm to 30 mm). Typically the average diameter of the composite wire is in a range from about 1 mm to 12 mm, 1 mm to 10 mm, 1 to 8 mm, or even 1 mm to 4 mm. In some embodiments, the average diameter of composite wire desirable is at least 1 mm, at least 1.5 mm, 2 mm, 3 mm, 4 mm, 5 mm, 6 mm, 7 mm, 8 mm, 9 mm, 10 mm, 11 mm, or even at least 12 mm.

Techniques for making aluminum composite wires are known in the art. For example, continuous metal matrix composite wire can be made by continuous metal matrix infiltration processes. One suitable process is described, for example, in U.S. Pat. No. 6,485,796 (Carpenter et al.), the disclosure of which is incorporated herein by reference. Other processing routes for continuous fiber reinforced metal matrix composites are, for example, discussed in ASM Handbook Vol. 21, Composites, pp. 584-588 (ASM International, Metals Park, Ohio), published in 2001, the disclosure of which is incorporated herein by reference.

Overhead electrical power transmission conductors having cores comprising a steel wire(s) are commercially available, for example, from Southwire, Carrollton, Ga. Typically, the steel wires of the core are a medium to high strength steel with a nominal tensile strength range of 1172 MPa (170 ksi) to 1931 MPa (280 ksi), and usually are coated to impart good corrosion resistance. Common coating materials include zinc (also known as galvanized) or zinc alloy with 5% aluminum-mischmetal. Additional types of coatings are aluminum or aluminum cladding, for example, aluminum clad steel (e.g., "ALUMOWELD", available from Alumoweld, Duncan, S.C.) such as Wires AWG #4 (with nominal diameter of 0.2043 inch (5.18 mm) ultimate tensile strength 115 ksi (109 kg/mm$^2$) weight of 93.63 lbs/1000 ft (139.3 kg/km) and a resistance of 1.222 ohms/1000 ft at 68° F. (4.009 ohms/km at 20° C.)), Wires AWG #8 (with nominal diameter of 0.1285 inch (3.264 mm) ultimate tensile strength 195 ksi (137 kg/mm$^2$) weight of 37.03 lbs/1000 ft (55.11 kg/km) and a resistance of 3.089 ohms/1000 ft at 68° F. (10.13 ohms/km at 20° C.)).

Polymeric core conductors such as composite fiber glass/carbon fiber core are available, for example, from Composite Technology Corporation, Irvine, Calif., under the trade designation "ACCC/TW DRAKE". Polymeric composites reinforced with carbon fiber are available, for example, from Tokyo Rope, Japan. Aluminum wires reinforced with silicon carbide fibers are available, for example, from Nippon Carbon, Japan. Aluminum wires reinforced with graphite fibers are available, for example, from Yazaki Corp., Japan.

In some embodiments, the coefficients of thermal expansion of overhead electrical power transmission conductor tension subsections are in a range from zero to $25 \times 10^{-6}$/° C. (in some embodiments, in a range from $8 \times 10^{-6}$/° C. to $20 \times 10^{-6}$/° C., or even $14 \times 10^{-6}$/° C. to $20 \times 10^{-6}$/° C.). In some embodiments, the densities of electrical power transmission conductor tension subsections are in a range from 1.4 g/cm$^3$ to 20 g/cm$^3$ (in some embodiments, in a range from 16 g/cm$^3$ to 19 g/cm$^3$, 2.7 g/cm$^3$ to 3.6 g/cm$^3$, or 2.2 g/cm$^3$ to 4.5 g/cm$^3$).

Conductors utilized in the present invention are typically stranded. A stranded conductor typically includes a central wire and a first layer of wires helically stranded around the central wire. Conductor stranding is a process in which individual strands of wire are combined in a helical arrangement to produce a finished conductor (see, e.g., U.S. Pat. No. 5,171,942 (Powers) and U.S. Pat. No. 5,554,826 (Gentry)). The resulting helically stranded wire rope provides far greater flexibility than would be available from a solid rod of equivalent cross sectional area. The helical arrangement is also beneficial because the stranded conductor maintains its overall round cross-sectional shape when the conductor is subject to bending in handling, installation, and use. Helically-stranded conductors may include as few as 7 individual strands to more common constructions containing 50 or more strands.

In some embodiments, and typically, the cross-sectional area of a conductor is in a range from about 100 mm$^2$ to about 1400 mm$^2$.

Additional details for making aluminum matrix composite wires and conductors include those discussed, for example, in U.S. Pat. Nos. 5,501,906 (Deve), 6,180,232 (McCullough et al.), 6,245,425 (McCullough et al.), 6,336,495 (McCullough et al.), 6,544,645 (McCullough et al.), 6,447,927 (McCullough et al.), 6,460,597 (McCullough et al.), 6,329,056 (Deve et al.), 6,344,270 (McCullough et al.), 6,485,796 (Carpenter et al.), 6,559,385 (Johnson et al.), 6,796,365 (McCullough et al.), 6,723,451 (McCullough et al.), 6,692,842 (McCullough et al.), 6,913,838 (McCullough et al.), 7,093,416 (Johnson et al.), 7,297,238 (Nayar et al.), and 7,131,308 (McCullough et al.), U.S. Pat. Application Publication Nos. 2005/0181228 A1 (McCullough et al.), 2006/0102377 A1 (Johnson et al.), 2006/0102378 A1 (Johnson et al.), U.S. application having Ser. No. 60/755,690, filed Jan. 30, 2005, and U.S. Pat. No. 7,353,602 (McCullough et al.), the disclosures of which are incorporated herein by reference for their teachings on making and using metal matrix composite wires and conductors comprising the same. Aluminum matrix composite containing conductors are also available, for example, from 3M Company under the trade designation "795 kcmil ACCR".

Additional details on selecting types of conductors, types of materials used for conductors, methods for manufacturing tension subsections, methods of connecting tension subsections, types of overhead power transmission lines, and other related examples may be found in U.S. Pat. No. 7,547,843 (Deve et al.) and U.S. Pat. Application Publication No. 2008/0162106 A1 (Johnson et al.), the disclosures of which are incorporated herein by reference.

The following example is offered to aid in the understanding of the present invention and is not to be construed as limiting the scope thereof.

EXAMPLE

The following example models a three conductor configuration for the river crossing illustrated in FIG. 4. Two conductors with different cross sectional areas were modeled: ASCR Chukar-type conductor 1780 kcmil 84/19 strand (available, for example, from Southwire Company, Carrollton, Ga.) for the short spans 48a and 48b; and ACSR Drake-type conductor 795 kcmil 26/7 (available, for example, from Southwire Company) for the central span 49. The following parameters for the three span configuration depicted in FIG. 4 are described in Table 4, below.

TABLE 4

| | |
|---|---|
| $S_1$ | 400 m |
| $S_2$ | 1000 m |
| $S_3$ | 400 m |
| $H_1$ | 20 m |
| $H_2$ | 100 m |
| $H_3$ | 100 m |

TABLE 4-continued

| | |
|---|---|
| $H_4$ | 20 m |
| $L_{ins}$ | 5 m |

For the Chukar-type conductor, a simplified elastic cable model (no creep and no nonlinear coefficients) using the parameters listed in Table 5, below, was used, and was based on data obtained from the Powerline Systems, Inc., Madison, Wis. website.

TABLE 5

| | |
|---|---|
| Cross section area | 976 mm² |
| Outer diameter | 40.7 mm |
| Unit weight | 30.28 N/m |
| Ultimate tension | 226,859 N |
| Final modulus of elasticity | 621.9 MPa/100 |
| Thermal expansion coefficient | 0.0020396/100 deg |
| Resistance at 25° C. | 0.03486 Ohm/km |
| Resistance at 75° C. | 0.04089 Ohm/km |
| Emissivity coefficient | 0.5 |
| Solar absorption coefficient | 0.5 |
| Outer strands heat capacity | 2394 Watt-s/m-° C. |
| Core heat capacity | 274.0 Watt-s/m-° C. |

For the Drake-type conductor, a simplified elastic cable model (no creep and no coefficients) using the parameters listed in Table 6, below, was used, and was based on data obtained from the Powerline Systems, Inc. website.

TABLE 6

| | |
|---|---|
| Cross section area | 468.6 mm² |
| Outer diameter | 28.14 mm |
| Unit weight | 15.96 N/m |
| Ultimate tension | 140,119 N |
| Final modulus of elasticity | 696.4 MPa/100 |
| Thermal expansion coefficient | 0.0018819/100 deg |
| Resistance at 25° C. | 0.07245 Ohm/km |
| Resistance at 75° C. | 0.08637 Ohm/km |
| Emissivity coefficient | 0.5 |
| Solar absorption coefficient | 0.5 |
| Outer strands heat capacity | 1064 Watt-s/m-° C. |
| Core heat capacity | 244.0 Watt-s/m-° C. |

Table 7 gives typical ambient conditions for calculating conductor ampacity. Using the parameters described in Tables 4-7, the software obtained from Powerline Systems, Inc. under the trade designation "PLS CADD" version 8.0 was used to evaluate the conductor operating temperatures using the "day of the year producing maximum solar heat" and the IEEE 738-1993 features of the software.

TABLE 7

| | |
|---|---|
| Latitude | 30° |
| Atmosphere | Clear |
| Sun time | 11 am |
| Line azimuth | 90° |
| Air temperature | 25° C. |
| Wind speed | 0.6096 m/s |
| Wind direction to conductor | 90° |
| Conductor elevation | None |
| Steady-state current | 1044 Amps |

The result of this evaluation indicated that Drake conductor would operate at a maximum of 90° C., and the Chukar conductor would have a maximum temperature of 54.6° C.

Using the calculated operating temperatures and data from Tables 4-6, Equation 1 was used to solve for the tension and insulator swings of the three span configurations shown in FIG. 4. Assuming that both conductors are installed at equal tension of 25,000 N, an air temperature of 15° C., and the insulators initially vertical, when the conductors reach their full operating temperatures of 90° C. and 54.6° C., Equation 1 results in the insulators swinging approximately 0.9° away from the central span, and a conductor horizontal component of tension of about 24,100 N. Conversely, if the lighter-weight Drake-type ACSR conductor had been used for the entire crossing depicted in FIG. 4, then using the ruling span-based sag-tension method feature of the PLS CADD software, the horizontal component of tension would drop to about 23,300 N when operating at 90° C.

Equation 1 was used to solve for $T_h$. This $T_h$ value was then used in Equation 2 to solve for sag. For the three span configuration having both ASCR Drake-type and ACSR Chuker-type, the central span (49) had a calculated sag of about 83 meters. When the same calculations are done using a single conductor type for the entire crossing such as using just the Drake ACSR-type conductor, the calculated sag for the central span was 86 meters.

Surprisingly, the mixed conductor crossing had about 3 meters less sag on the central span, which may be desirable, for example, to allow larger ships to pass under the crossing.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for providing an installed dead-end-to-dead-end overhead electrical power transmission line,
the method comprising:
providing first and second dead-end towers;
providing at least one suspension tower between the first and second dead-end towers; and
selecting an overhead electrical power transmission conductor tension section having first and second ends and a length of at least 100 meters, the overhead electrical power transmission conductor tension section comprising at least a first and a second sequential overhead electrical power transmission conductor tension subsection, wherein the first overhead electrical power transmission conductor tension subsection has a first coefficient of thermal expansion, a first density, a first stress-strain behavior, and a first cross-sectional area, wherein the second overhead electrical power transmission conductor tension subsection has a second coefficient of thermal expansion, a second density, a second stress-strain behavior, and a second cross-sectional area, wherein intentionally at least one of (a) the first and second coefficients of thermal expansion, (b) the first and second densities, (c) the first and second stress-strain behaviors, or (d) cross-sectional areas the first and second overhead electrical power transmission conductor tension subsection, at temperatures in the range from 20° C. to 75° C., are different such that, over at least a temperature range 20° C. to 75° C., as current flow increases through the overhead electrical power transmission conductor tension section, wherein the tension of the second overhead electrical power transmission conductor subsection is higher as compared to the tension of the second overhead electrical power transmission tension subsection under the same conditions when the entire conductor tension section consists of just the conductor of the second overhead electrical power transmission conductor tension subsection; and installing the selected overhead electrical power transmission conductor tension section, wherein the first and second ends of the overhead electrical power transmission conductor tension section are attached to the first and second dead-end towers, respectively, and at least a portion of the sequential overhead electrical power transmission conductor tension subsection being supported by the suspension tower.

2. The method according to claim 1 wherein the overhead electrical power transmission conductor tension section having first and second ends and a length of at least 800 meters.

3. The method according to claim 2, wherein the composite core comprises at least one of an aluminum or aluminum alloy matrix composite.

4. The method according to claim 2, wherein the first sequential overhead electrical power transmission conductor tension subsection comprises a composite core.

5. The method according to claim 4, wherein the composite core comprises polymeric matrix composite.

6. The method according to claim 4, wherein the first and second coefficients of thermal expansion are in a range from zero to $25 \times 10^{-6}/°$ C.

7. The method according to claim 4, wherein the first and second densities are in a range from 1.4 g/cm$^3$ to 20 g/cm$^3$.

8. The method according to claim 4, wherein the first and second coefficients of thermal expansion are in a range from zero to $25 \times 10^{-6}/°$ C., and wherein the first and second densities are in a range from 1.4 g/cm$^3$ to 20 g/cm$^3$.

9. The method according to claim 4, wherein the first and second densities are in a range from 2.7 g/cm$^3$ to 3.6 g/cm$^3$.

10. The method according to claim 4, wherein the first and second densities are in a range from 2.2 g/cm$^3$ to 4.5 g/cm$^3$.

11. The method according to claim 4, wherein the second sequential overhead electrical power transmission conductor section has a steel core.

12. The method according to claim 4, wherein the second sequential overhead electrical power transmission conductor tension subsection has a core having a cross-sectional area, wherein at least 50 percent of the cross-sectional area of the core is aluminum matrix composite wire.

13. The method according to claim 4, wherein the second sequential overhead electrical power transmission conductor tension subsection has an aluminum matrix composite core.

14. The method according to claim 1, wherein the overhead electrical power transmission conductor tension section having first and second ends and a length of at least 1000 meters.

15. A dead-end-to-dead-end overhead electrical power transmission line comprising:

first and second dead-end towers;
at least one suspension tower between the first and second dead-end towers; and
an overhead electrical power transmission conductor tension section having a first end attached to the first dead-end tower and a second end attached to the second dead-end tower, the overhead electrical power transmission conductor tension section comprising at least a first and a second sequential overhead electrical power transmission conductor tension subsection, wherein the first overhead electrical power transmission conductor tension subsection has at least one of a composite core or an Invar core, a first coefficient of thermal expansion, a first density, a first stress-strain behavior, and a first cross-sectional area, wherein the second overhead electrical power transmission conductor tension subsection has a second coefficient of thermal expansion, a second density, a second stress-strain behavior, and a second cross-sectional area, wherein at least one of (a) the first and second coefficients of thermal expansion, (b) the first and second densities, (c) the first and second stress-strain behaviors, or (d) cross-sectional areas, at temperatures in the range from 20° C. to 75° C., are different such that, over at least a temperature range 20° C. to 75° C., as current flow increases through the overhead electrical power transmission conductor tension section, wherein the tension of the second overhead electrical power transmission conductor subsection is higher as compared to the tension of the second overhead electrical power transmission tension subsection under the same conditions when the entire conductor tension section consists of just the conductor of the second overhead electrical power transmission conductor tension subsection.

16. The dead-end-to-dead-end overhead electrical power transmission line according to claim 15, wherein the first sequential overhead electrical power transmission conductor tension subsection comprises the composite core.

17. The dead-end-to-dead-end overhead electrical power transmission line according to claim 15, wherein the composite core comprises at least one of an aluminum or aluminum alloy matrix composite.

18. The dead-end-to-dead-end overhead electrical power transmission line according to claim 15, wherein the composite core comprises polymeric matrix composite.

19. The dead-end-to-dead-end overhead electrical power transmission line according to claim 15, comprising at least three suspension towers positioned between the first and second dead-end towers.

* * * * *

UNITED STATES PATENT AND TRADEMARK OFFICE
CERTIFICATE OF CORRECTION

| | | |
|---|---|---|
| PATENT NO. | : 7,687,710 B2 | Page 1 of 1 |
| APPLICATION NO. | : 11/617494 | |
| DATED | : March 30, 2010 | |
| INVENTOR(S) | : Jachim et al. | |

It is certified that error appears in the above-identified patent and that said Letters Patent is hereby corrected as shown below:

Column 7
Line 12, delete "ION" and insert --10N--

Column 14
Line 25, delete "Weybum" and insert --Weyburn--

Column 20
Line 54, after "areas" insert --of--

Signed and Sealed this
Nineteenth Day of April, 2011

David J. Kappos
*Director of the United States Patent and Trademark Office*